(12) United States Patent
Kim et al.

(10) Patent No.: US 12,326,504 B2
(45) Date of Patent: Jun. 10, 2025

(54) DISTANCE MEASURING APPARATUS AND IMPULSE IQ SIGNAL MISMATCH CALIBRATION APPARATUS

(71) Applicant: UIF (University Industry Foundation), Yonsei University, Seoul (KR)

(72) Inventors: Tae Wook Kim, Seoul (KR); Min Jae Yoo, Seoul (KR); Geun Haeng Lee, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 834 days.

(21) Appl. No.: 17/563,556

(22) Filed: Dec. 28, 2021

(65) Prior Publication Data

US 2022/0206147 A1  Jun. 30, 2022

(30) Foreign Application Priority Data

Dec. 28, 2020  (KR) .................. 10-2020-0185326

(51) Int. Cl.
*G01S 17/26* (2020.01)
*G01S 7/484* (2006.01)
(Continued)

(52) U.S. Cl.
CPC ............ *G01S 17/26* (2020.01); *G01S 7/484* (2013.01); *G01S 17/58* (2013.01); *G01S 7/4865* (2013.01); *G01S 17/89* (2013.01)

(58) Field of Classification Search
CPC .......... G01S 17/26; G01S 7/484; G01S 17/58; G01S 7/4865; G01S 17/89
See application file for complete search history.

(56) References Cited

U.S. PATENT DOCUMENTS

| 5,774,091 A | 6/1998 | McEwan |
| 2019/0178993 A1* | 6/2019 | Sadhu .................. G01S 17/34 |

FOREIGN PATENT DOCUMENTS

| JP | 2001-141811 A | 5/2001 |
| JP | 4544866 B2 | 9/2010 |

(Continued)

OTHER PUBLICATIONS

Jui-Yuan Yu et al., "A 31.2mW UWB Baseband Transceiver with All-Digital I/Q-mismatch Calibration and Dynamic Sampling", 2006 Symposium on VLSI Circuits, 2006. Digest of Technical Papers, 2006, pp. 1-3, IEEE.

(Continued)

*Primary Examiner* — Joseph J Lauture
(74) *Attorney, Agent, or Firm* — Paratus Law Group, PLLC

(57) ABSTRACT

A distance measuring apparatus includes: a digital-to-time converter (DTC) configured to receive a clock signal and output a pulse corresponding to a provided code; an in-phase (I) template generation part configured to be triggered by the pulse output from the DTC to generate an I template impulse signal; a quadrature (Q) template generation part configured to be triggered by the pulse output from the DTC to generate a Q template impulse signal; and an I correlator configured to perform demodulation with the signal reflecting off the target and the I template impulse signal, and a Q correlator configured to perform demodulation with the signal reflecting off the target and the Q template impulse signal, wherein the distance measuring apparatus converts a result of demodulation into a digital code to measure the distance to the target.

19 Claims, 6 Drawing Sheets

(51) Int. Cl.
*G01S 17/58* (2006.01)
*G01S 7/4865* (2020.01)
*G01S 17/89* (2020.01)

(56) References Cited

FOREIGN PATENT DOCUMENTS

| JP | 2017-053769 A | 3/2017 |
|---|---|---|
| KR | 10-1612739 B1 | 4/2016 |
| KR | 10-2016-0130265 A | 11/2016 |
| KR | 10-2018-0070987 A | 6/2018 |

OTHER PUBLICATIONS

Korean Office Action for related KR Application No. 10-2020-0185326 mailed Jul. 11, 2022 from Korean Intellectual Property Office.

* cited by examiner

DISTANCE MEASURING APPARATUS AND IMPULSE IQ SIGNAL MISMATCH CALIBRATION APPARATUS

CROSS REFERENCE TO RELATED APPLICATION

The present application claims priority to Korean Patent Application No. 10-2020-0185326, filed Dec. 28, 2020, the entire contents of which is incorporated herein for all purposes by this reference.

BACKGROUND

The present disclosure relates to a distance measuring apparatus and an impulse IQ signal mismatch calibration apparatus.

A technology for measuring the time of flight (TOF) of a signal that is transmitted and returns and for measuring a distance to a target from the TOF has been utilized. The technology has been utilized in the following technologies: a radar technology in which an RF signal is emitted, the signal reflecting off a target is detected, and the speed of the target is measured using a distance to the target and the Doppler effect; and a LiDAR technology in which an optical signal is provided and the signal reflecting off a target is detected.

The foregoing is intended merely to aid in the understanding of the background of the present disclosure, and is not intended to mean that the present disclosure falls within the purview of the related art that is already known to those skilled in the art.

SUMMARY

An apparatus for measuring a distance by using an impulse signal has been developed. An impulse transmitter forms an impulse signal and provides the same to a target, and the signal reflecting off the target is received and processed to detect a distance to the target or a moving speed of the target or both. However, there is an increasing need for processing accurate information on a location of a target in a process of processing an impulse signal.

The present disclosure is intended to solve the problem in the related art. That is, the present disclosure is intended to provide a technology for precisely measuring a distance to a target and precisely controlling a phase difference of an impulse template signal.

According to an embodiment, there is provided a distance measuring apparatus for measuring a distance to a target by providing an impulse signal to the target and using the signal reflecting off the target, the distance measuring apparatus including: a digital-to-time converter (DTC) configured to receive a clock signal and output a pulse corresponding to a provided code; an in-phase (I) template generation part configured to be triggered by the pulse output from the DTC to generate an I template impulse signal; a quadrature (Q) template generation part configured to be triggered by the pulse output from the DTC to generate a Q template impulse signal; and an I correlator configured to perform demodulation with the signal reflecting off the target and the I template impulse signal, and a Q correlator configured to perform demodulation with the signal reflecting off the target and the Q template impulse signal, wherein the distance measuring apparatus converts a result of demodulation into a digital code to measure the distance to the target.

According to an aspect of the embodiment, the I template generation part may include a signal delay unit configured to delay the pulse output from the DTC, wherein the signal delay unit may include a plurality of buffers connected in a cascade manner, and a controllable delay unit connected between outputs of the buffers and a reference voltage, and the signal delay unit may be configured to delay the pulse output from the DTC so that a phase of the I template signal generated by the I template generation part and a phase of the Q template signal generated by the Q template generation part differ by a 90 degree angle.

According to an aspect of the embodiment, the Q template generation part may include a signal delay unit configured to delay the pulse output from the DTC, wherein the signal delay unit may include a plurality of buffers connected in a cascade manner, and a controllable delay unit connected between outputs of the buffers and a reference voltage, and the signal delay unit may be configured to delay the pulse output from the DTC so that a phase of the Q template signal generated by the Q template generation part and a phase of the I template signal generated by the I template generation part differ by a 90 degree angle.

According to an aspect of the embodiment, the controllable delay unit may include switches, and capacitors connected to the switches respectively in series, wherein connection and disconnection of the switches may be controlled by a control signal.

According to an aspect of the embodiment, the capacitors of the controllable delay unit connected to the outputs of the buffers may have the same capacitance.

According to an aspect of the embodiment, the capacitors of the controllable delay unit connected to the outputs of the buffers may have different capacitances.

According to an aspect of the embodiment, capacitance of any one of the capacitors of the controllable delay unit connected to the outputs of the buffers may be different from capacitance of another of the capacitors by the nth power of 2.

According to an aspect of the embodiment, the distance measuring apparatus may further include: an analog-to-digital converter (ADC) configured to convert the result of demodulation into the digital code; and a processor configured to calculate the distance to the target by using the digital code.

According to an aspect of the embodiment, the processor may be configured to control the controllable delay unit by comparing an amplitude and a phase angle when the I template impulse signal and the Q template impulse signal have a phase difference of a 90 degree angle, with an amplitude and a phase angle of the I template impulse signal generated by the I template generation part and with an amplitude and a phase angle of the Q template impulse signal generated by the Q template generation part.

According to an aspect of the embodiment, the I correlator may include: a mixer configured to mix the signal reflecting off the target and the I template impulse signal; and an integrator configured to accumulate an output of the mixer, and the Q correlator may include: a mixer configured to mix the signal reflecting off the target and the Q template impulse signal; and an integrator configured to accumulate an output of the mixer.

According to an embodiment, there is provided a template impulse signal generation circuit including: an in-phase (I) template signal generation part configured to be triggered by a pulse output from a digital-to-time converter (DTC) to generate an I template impulse signal; a quadrature (Q) template signal generation part configured to be triggered by the pulse output from the DTC to generate a Q template impulse signal; and a delay unit configured to delay the pulse output from the DTC so that the I template impulse signal and the Q template impulse signal have a phase difference of a 90 degree angle.

According to an embodiment, there is provided a template signal mismatch calibration apparatus including: a digital-to-time converter (DTC) configured to receive a clock signal and output a pulse corresponding to a provided code; an in-phase (I) template generation part configured to be triggered by the pulse output from the DTC to generate an I template impulse signal; a quadrature (Q) template generation part configured to be triggered by the pulse output from the DTC to generate a Q template impulse signal; and a processor configured to control a delay time of the pulse output from the DTC, by comparing an amplitude and a phase angle when the I template impulse signal and the Q template impulse signal has a phase difference of a 90 degree angle, with an amplitude and a phase angle of the I template impulse signal generated by the I template generation part and with an amplitude and a phase angle of the Q template impulse signal generated by the Q template generation part.

According to the embodiment, a distance to a target can be precisely measured, and the phase difference between the I impulse template signal and the Q impulse template signal can be precisely adjusted. In addition, by precisely controlling the phase difference between the I impulse template signal and the Q impulse template signal, the resolution in the demodulation process of the analog-to-digital converter (ADC) can be increased, so that a distance to a target can be precisely measured.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
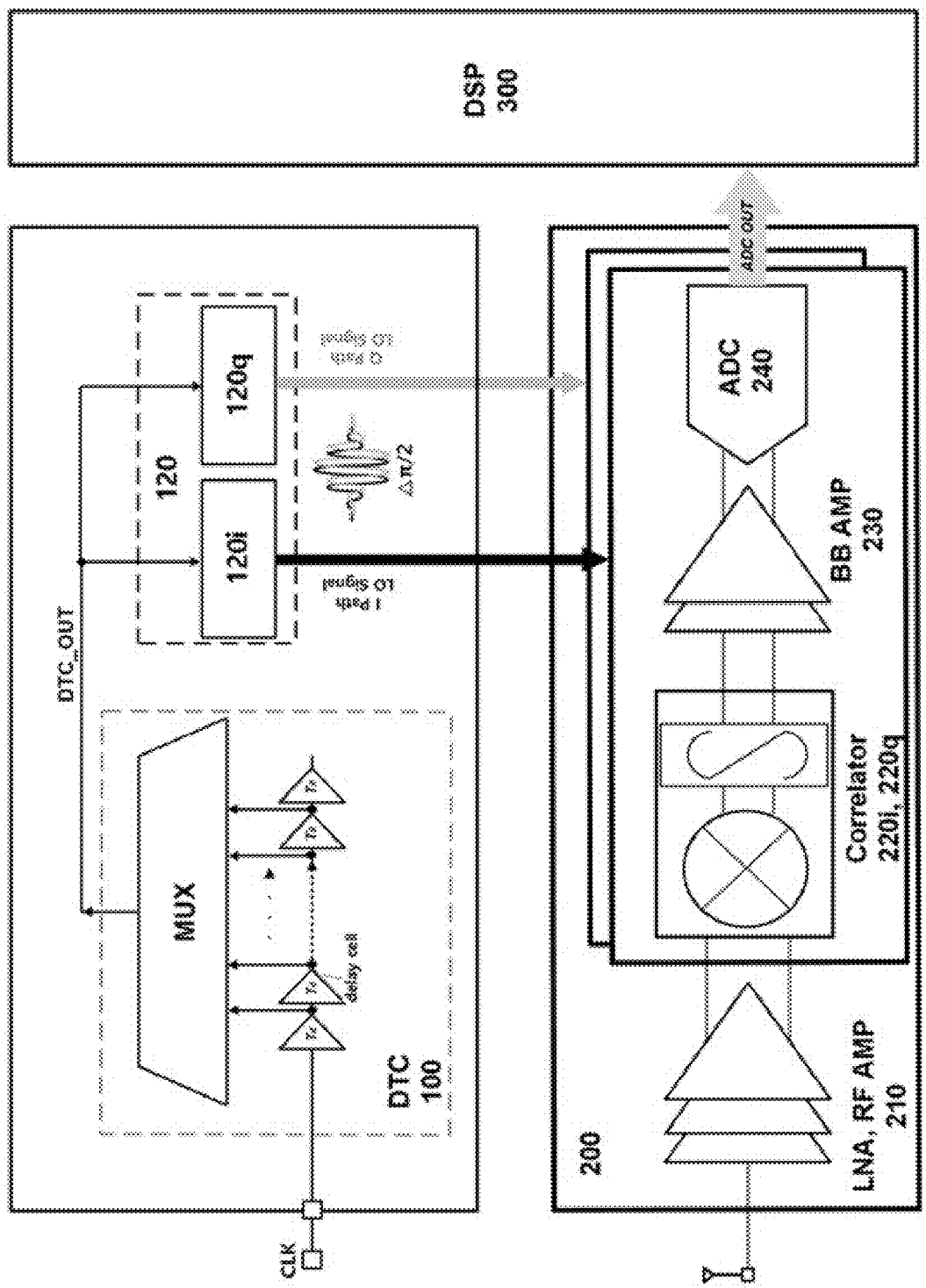
FIG. 1 is a block diagram illustrating an outline of a distance measuring apparatus 10 according to an embodiment.

Hereinafter, an embodiment will be described with reference to the accompanying drawings. FIG. 1 is a block diagram illustrating an outline of a distance measuring apparatus 10 according to an embodiment. Referring to FIG. 1, the apparatus 10 according to the embodiment provides an impulse signal to a target (not shown) and measures the distance to the target by using the signal reflecting off the target. The apparatus 10 includes: a digital-to-time converter (DTC) 100 configured to receive a clock signal CLK and output a pulse corresponding to a provided code; an in-phase (I) template signal generation part 120*i* configured to receive the pulse DTC_OUT output from the DTC 100 and generate an I template impulse signal; a quadrature (Q) template signal generation part 120*q* configured to receive the pulse DTC_OUT output from the DTC 100 and generate a Q template impulse signal; an I correlator 220*i* configured to perform demodulation with the signal reflecting off the target and the I template signal; and a Q correlator 220*q* configured to perform demodulation with the signal reflecting off the target and the Q template signal, wherein the apparatus 10 converts a result of demodulation into a digital code to measure the distance to the target.

A clock signal CLK and a control code (not shown) are input to the DTC 100. The DTC 100 includes a plurality of delay cells for delaying the input clock signal by a predetermined delay time Td. The delay cells are connected to each other in a cascade manner, and an output of each delay cell is input to a multiplexer MUX. In an embodiment, the control code (not shown) may be provided by a digital signal processor (DSP) 300.

The DTC 100 controls the multiplexer MUX according to the input control code (not shown) to output a signal delayed by a desired delay time as a DTC output pulse DTC_OUT. The output pulse DTC_OUT of the DTC 100 is input to a template signal generation part 120.

Figure 2:
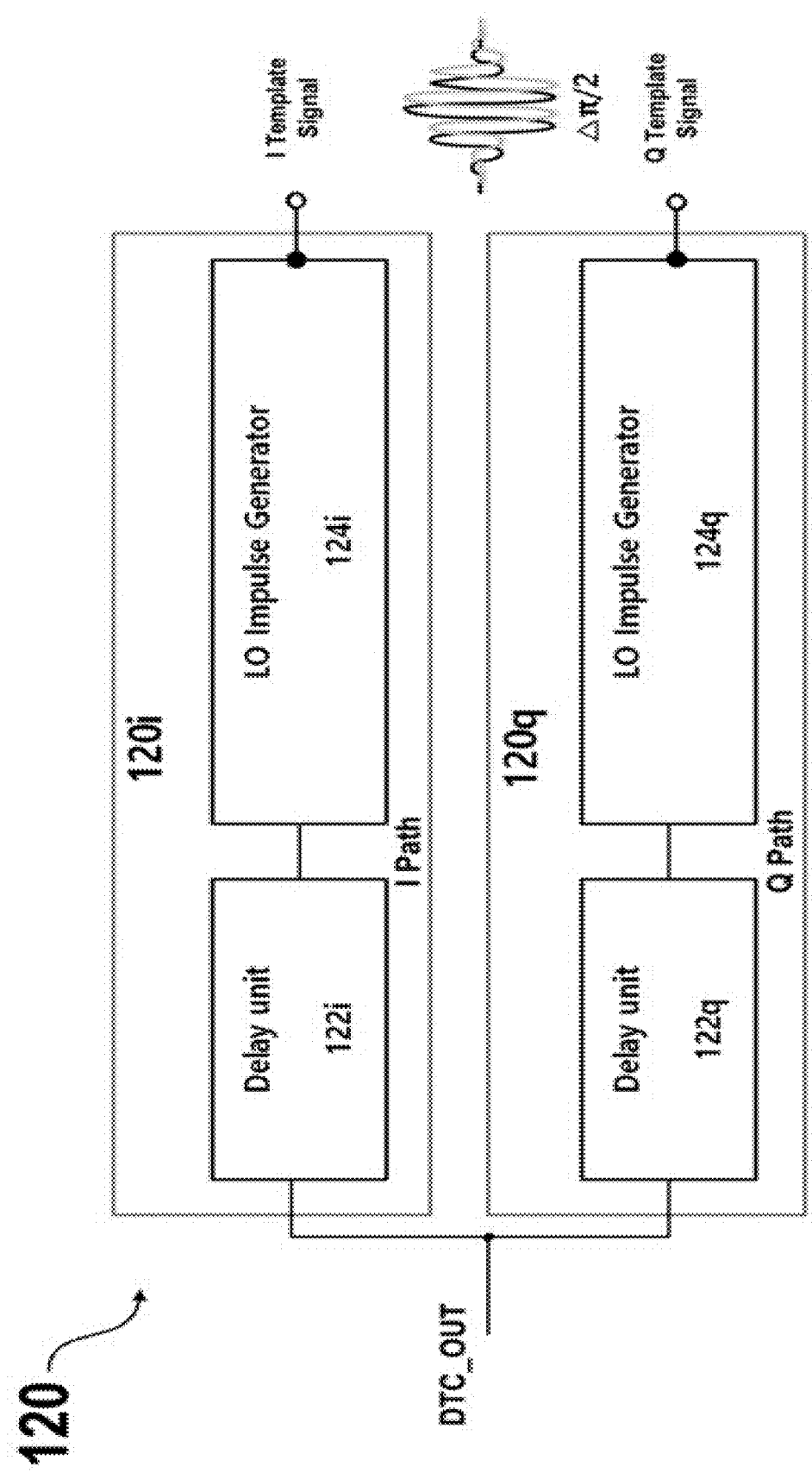
FIG. 2 is a block diagram illustrating an outline of a template signal generation part 120.

FIG. 2 is a block diagram illustrating an outline of the template signal generation part 120. Referring to FIG. 2, the template signal generation part 120 includes the I template signal generation part 120*i* and the Q template signal generation part 120*q*. FIG. 2 illustrates that the I template signal generation part 120*i* and the Q template signal generation part 120*q* includes a signal delay unit 122*i* and a signal delay unit 122*q*, respectively. However, in an embodiment not shown, either the I path or the Q path may include a signal delay unit.

Referring to FIG. 2, the output pulse DTC_OUT of the DTC 100 is delayed through the signal delay unit 122*i* of the I path and triggers an impulse generator 124*i* so that an I template signal is formed. In addition, the output pulse DTC_OUT of the DTC 100 triggers an impulse generator 124*q* so that a Q template signal is formed. The output pulse DTC_OUT delayed by the signal delay unit 122*i* and by the signal delay unit 122*q* is delayed such that the I template signal generated by the I template signal generator 124*i* and the Q template signal generated by the Q template signal generator 124*q* have a phase difference of a 90 degree angle from each other, and resulting pulses are input to the respective impulse generators 124*i* and 124*q*.

In an embodiment not shown, the template signal generation circuit 120 may include the signal delay unit only in either the I path or the Q path. In this case, the output pulse delayed through the signal delay unit is delayed such that the I template signal generated by the I template signal generator and the Q template signal generated by the Q template signal generator have a phase difference of a 90 degree angle from each other, and resulting pulses are input to the respective impulse generators.

Figure 3:
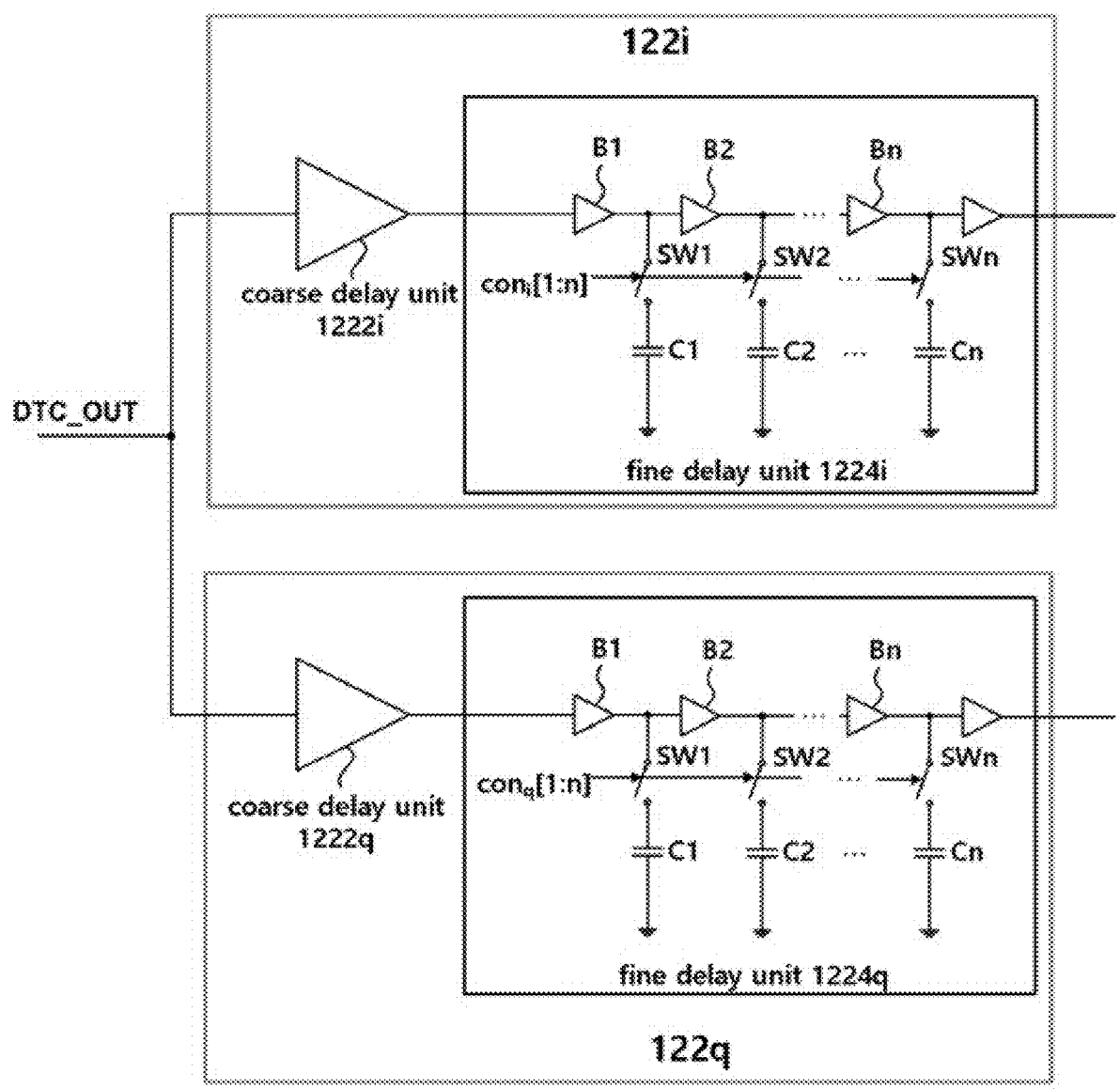
FIG. 3 is a diagram illustrating an outline of any one signal delay unit 122 among signal delay units 122*i* and 122*q* included in an I path and a Q path, respectively.

FIG. 3 is a diagram illustrating an outline of any one signal delay unit 122 among the signal delay units 122*i* and 122*q* included in the I path and the Q path, respectively. In the embodiment illustrated in FIG. 3, the signal delay unit 122*i* may include a coarse delay unit 1222*i* and a fine delay unit 1224i. The signal delay unit 122q may include a coarse delay unit 1222q and a fine delay unit 1224q.

The coarse delay unit 1222i and the coarse delay unit 1222q delay the output pulse DTC_OUT such that the I template signal generated by the I template generator 124i (see FIG. 2) and the Q template signal generated by the Q template generator 124q (see FIG. 2) have a phase difference of about a 90 degree angle. In an embodiment, the coarse delay unit 1222i and the coarse delay unit 1222q may be buffers that delay the input output pulse DTC_OUT by a predetermined delay time and output resulting pulses.

The fine delay units 1224i and 1224q adjust the delay of the output pulse DTC_OUT finely so that the phase difference between the I template signal and the Q template signal is a 90 degree angle. When an integrated circuit is designed, the operation timing of the circuit varies according to changes in process, voltage, and temperature (PVT) in addition to noise. Due to these changes, there is a possibility that the phase difference between I and Q signals may not be a 90 degree angle at an unexpected position. If mismatch of a phase difference occurs during I and Q modulation using an impulse signal with a short signal duration, it may adversely affect recognition resolution. Therefore, the phase difference between the I template signal and the Q template signal needs to be accurately controlled.

Each of the fine delay units 1224i and 1224q includes a plurality of buffers B1, B2, . . . , and Bn connected to each other in a cascade manner, and controllable delay elements connected to the output of the respective buffers. In an embodiment, the controllable delay elements may include capacitors C1, C2, . . . , and Cn, and switches SW1, SW2, . . . , and SWn connected to the respective capacitors in series. The controllable delay elements may be connected between the output of the respective buffers and a reference voltage. In the shown embodiment, in the fine delay units 1224i and 1224q, the buffers B1, B2, . . . , and Bn are exemplified, but inverters may be employed.

Each of the switches SW1, SW2, . . . , and SWn included in the controllable delay elements may be an element in which connection or disconnection or both between one electrode and another electrode are controlled by an electrical signal provided to a control electrode. For example, the switches SW1, SW2, . . . , and SWn may be NMOS transistors, PMOS transistors, NPN bipolar transistors, or PNP bipolar transistors. Connection and disconnection of the switches SW1, SW2, . . . , and SWn may be controlled by a control signal ($con_i[1:n]$, $con_q[1:n]$) provided from the DSP 300.

The capacitors included in the controllable delay elements may have, for example, the same capacitance. The delay time varies linearly according to the number of connected capacitors. Therefore, according to the embodiment, the number of capacitors to be connected can be simply calculated according to a desired delay time.

As another example, the capacitors included in the controllable delay elements may have different capacitances. For example, the capacitance of a capacitor may follow the relation $Cn+1=2^n C1$. That is, each of the capacitors may follow a value expressed as the product of capacitance C1 and the nth power of 2. By forming the capacitances in this way, the capacitors to be connected according to a desired delay time can be precisely calculated. As still another example, the capacitors may have different capacitances.

In the shown embodiment, the I path and the Q path include the signal delay units 122i and 122q, respectively. Alternatively, the signal delay unit may be provided in either the I path or the Q path, as described above. When the signal delay unit is provided as described above, the output pulse of the DTC 100 is delayed such that an I template signal and a Q template signal generated by a Q template signal generator have a phase difference of a 90 degree angle from each other, and resulting pulses are input to the impulse generators.

Referring back to FIGS. 1 and 2, the impulse generators 124i and 124q receive the output pulses of the DTC 100, generate the I template signal and the Q template signal, and provide the same to a reception circuit 200. The reception circuit 200 receives a signal that is formed as an impulse signal that has been transmitted reflects off a target. The received signal is processed at a front end 210 of the reception circuit and the processed signal is provided to a correlator, wherein the front end 210 includes a low noise amplifier (LNA) and an RF amplifier. The correlator may include an I correlator 220i and a Q correlator 220q. The I correlator 220i and the Q correlator 220q each may include a mixer and an integrator.

Figure 4:
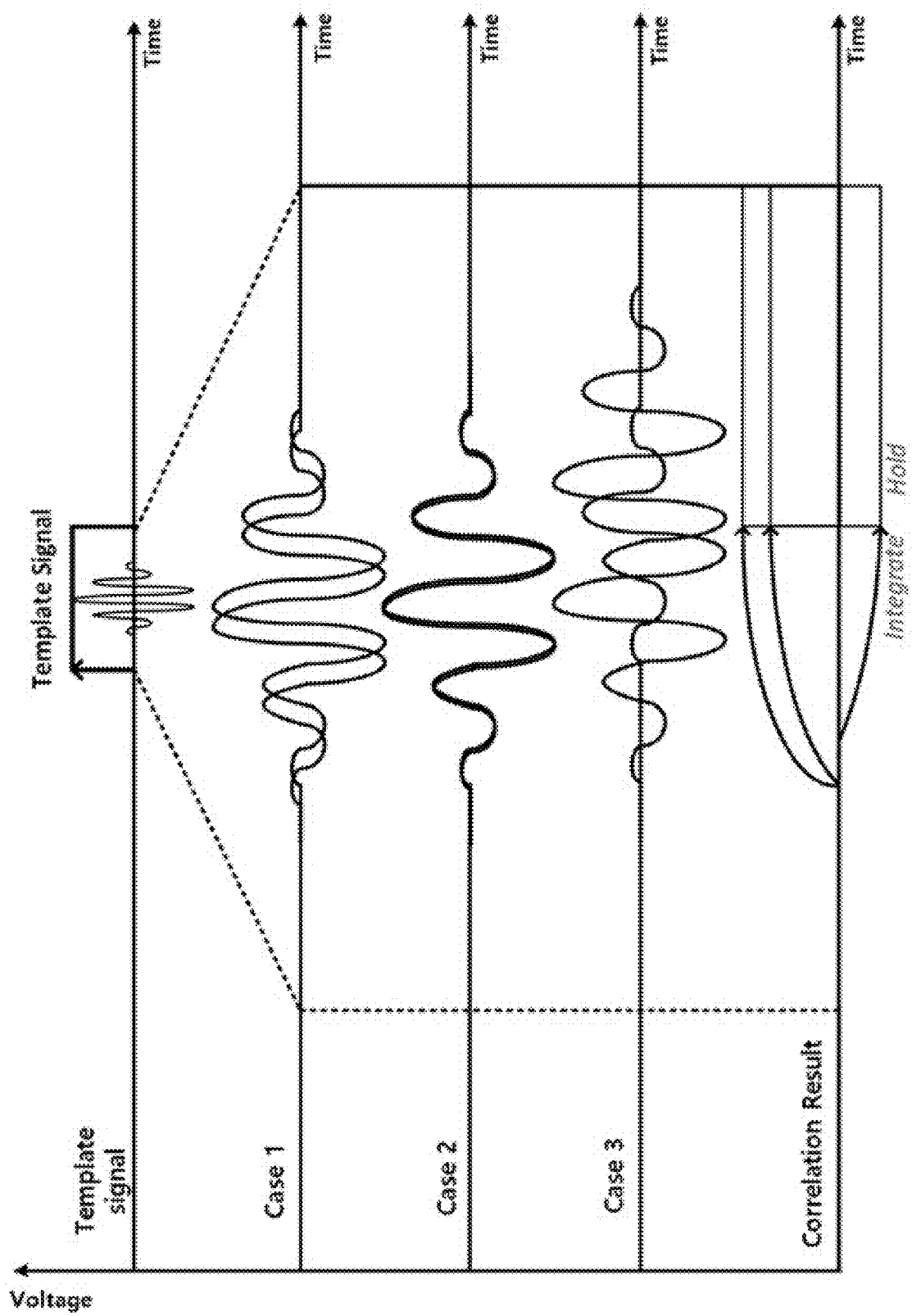
FIG. 4 is a diagram illustrating signal processing in correlators 220*i* and 220*q*.

FIG. 4 is a diagram illustrating signal processing in the correlators 220i and 220q. The signal reflecting off a target is processed at the front end 210 and the processed signal is input to the correlators 220i and 220q. An I template signal and a Q template signal are generated by the trigger of the delayed output pulses DTC_OUT, and input to the correlators 220i and 220q. The I template signal and the Q template signal have the same frequency as the impulse signal transmitted to the target. Depending on a position at which the I template signal and the reflected impulse signal overlap, a particular voltage value is obtained through correlation. This is used as information for calculation required to measure the distance.

When time differences between the template signal and the received signal are the same as case 1, case 2, and case 3, a correlation result is obtained by mixing and accumulating the template signal and the received signal, the correlation result is amplified by a baseband amplifier (BB AMP) 230, and a result of amplification is shown in the lowest of FIG. 4. An analog-to-digital converter (ADC) 240 receives the signals amplified in the baseband, converts the same to a digital code, and provides the digital code to the digital signal processor (DSP) 300. The DSP 300 uses a provided code to calculate the distance to the target.

Figure 5A:
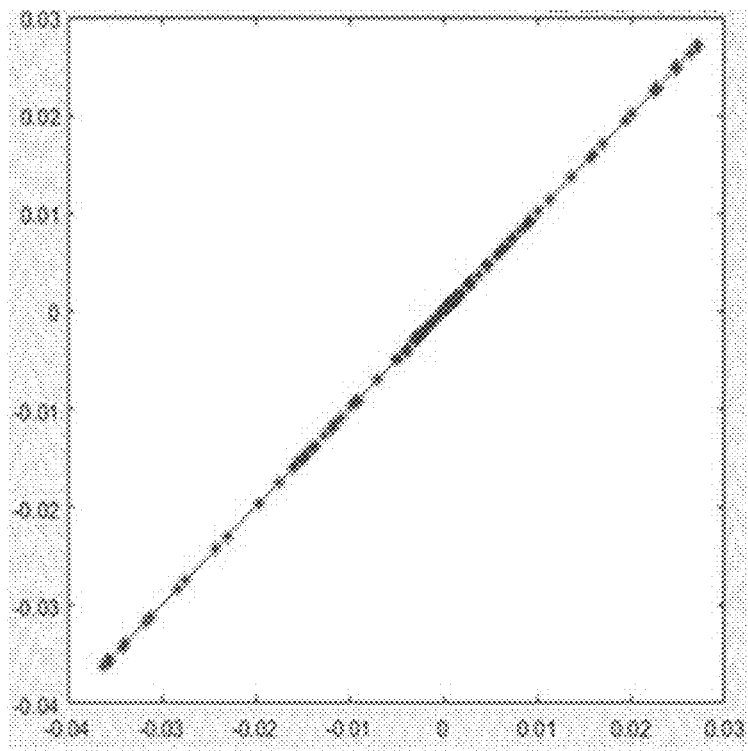
FIG. 5A is a diagram illustrating the amplitudes when a phase difference between an I template signal and a Q template signal in the form of impulse signals is close to zero.
Figure 5B:
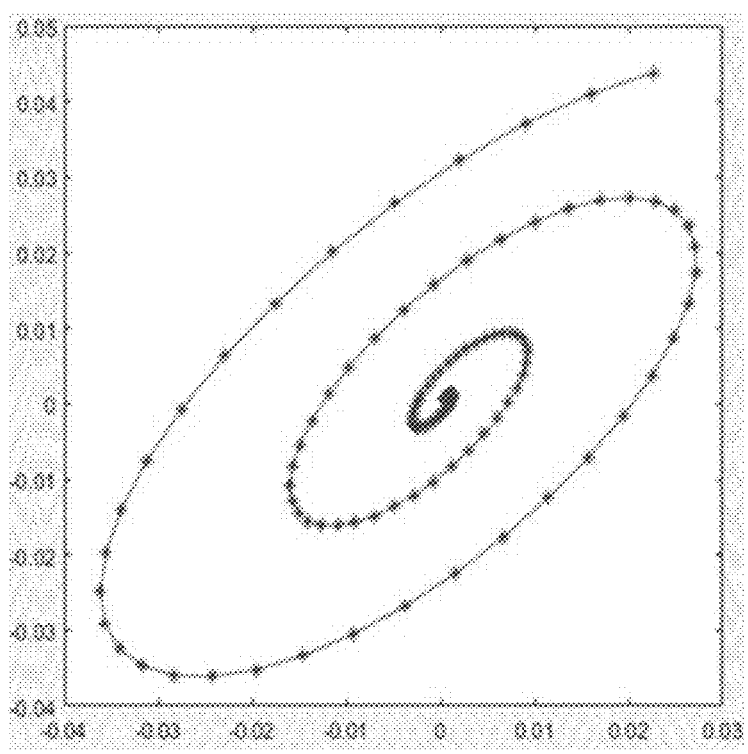
FIG. 5B is a diagram illustrating the amplitudes when a phase difference between an I template signal and a Q template signal is a 45 degree angle.
Figure 5C:
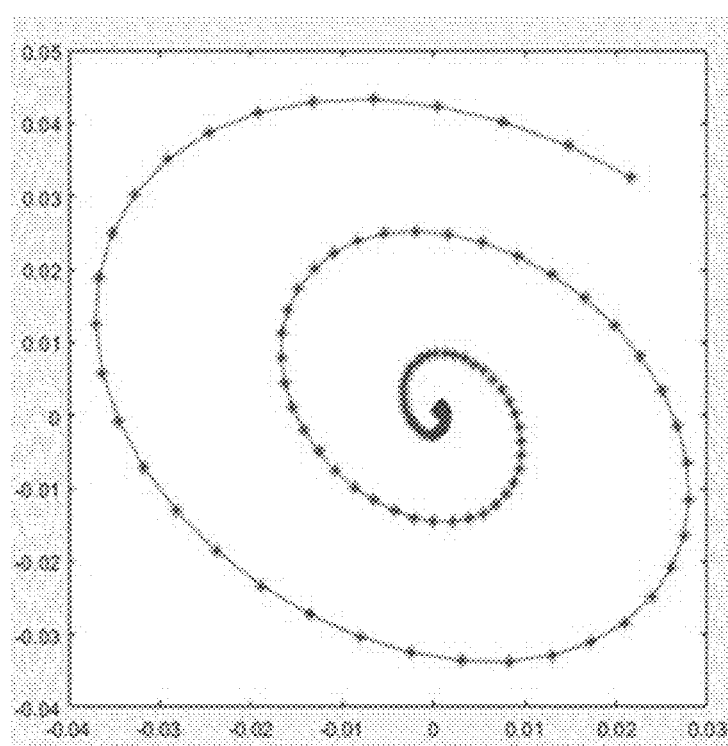
FIG. 5C is a diagram illustrating amplitude changes of an I template signal and a Q template signal at the time when a phase difference between the I template signal and the Q template signal is a 90 degree angle.

FIGS. 5A to 5C are diagrams illustrating a process in which the DSP 300 calculates a phase difference between an I template signal and a Q template signal. FIG. 5A is a diagram illustrating the amplitudes when a phase difference between an I template signal and a Q template signal in the form of impulse signals is close to zero. Referring to FIG. 5A, when plotting the amplitudes of the I template signal and the Q template signal between which the phase difference is close to a zero degree angle with a predetermined time difference, the amplitudes of the I template signal and the Q template signal appear to change on a straight line. FIG. 5B is a diagram illustrating the amplitudes when a phase difference between an I template signal and a Q template signal is a 45 degree angle. Referring to FIG. 5B, when the phase difference between the I template signal and the Q template signal is a 45 degree angle, it is found that the amplitudes over time are out of a straight line, gradually have a spiral shape and as time elapses, the amplitudes converge on 0. FIG. 5C is a diagram illustrating amplitude changes of an I template signal and a Q template signal at the time when a phase difference between the I template signal and the Q template signal is a 90 degree angle. Referring to FIG. 5C, when the phase difference between the I template signal and the Q template signal is a 90 degree angle, it is found that phase angle changes at measurement points at the same time intervals are constant. In addition, it is found that as time elapses, the distance from the origin decreases.

The DSP 300 stores the phase angle between the origin and each measurement point and distance information between the origin and each measurement point when the phase difference between the I template signal and the Q template signal is a 90 degree angle. The phase angles of the I template signal and the Q template signal are measured, and the phase angle between the origin and each measurement point and the distance information between the origin and each measurement point are measured and compared to the case in which the phase difference is a 90 degree angle.

For example, the DSP 300 compares the measured phase difference and amplitudes of the I template signal and the Q template signal to the stored case of the phase difference of a 90 degree angle. Next, a required delay time is calculated, and from a calculation result, a desired delay time is calculated.

The DSP 300 calculates the capacitance to be formed in the fine delay unit 1224*i* and the fine delay unit 1224*q* from the obtained delay time, forms the control signals $con_i[1:n]$ and $con_q[1:n]$ for controlling the switches SW1*s*, SW2*s*, . . . , and SWn*s* included in the fine delay unit 1224*i* and the fine delay unit 1224*q*, and controls the phase difference between the I template signal and the Q template signal by controlling the switches.

According to the embodiment, by precisely adjusting a phase difference between an I template signal and a Q template signal, influence on various variables in the process can be minimized and a positioning system having improved resolution with the phase difference of a 90 degree angle between the two signals is realized. Further, a distance to a target can be measured with high improved resolution, and an ADC with a low number of bits is utilized, which is advantageous in terms of cost.

While the embodiments shown in the drawings have been described as reference in order to help an understanding of the present disclosure, the above embodiments are merely illustrative for the purpose of implementation, and also it is to be understood by those skilled in the art that various modifications and equivalent embodiments may be made. Accordingly, the scope of the present disclosure should be defined by the accompanying claims.

What is claimed is:

1. A distance measuring apparatus for measuring a distance to a target by providing an impulse signal to the target and using the signal reflecting off the target, the distance measuring apparatus comprising:
    a digital-to-time converter (DTC) configured to receive a clock signal and output a pulse corresponding to a provided code;
    an in-phase (I) template generation part configured to be triggered by the pulse output from the DTC to generate an I template impulse signal;
    a quadrature (Q) template generation part configured to be triggered by the pulse output from the DTC to generate a Q template impulse signal; and
    an I correlator configured to perform demodulation with the signal reflecting off the target and the I template impulse signal, and a Q correlator configured to perform demodulation with the signal reflecting off the target and the Q template impulse signal,
    wherein the distance measuring apparatus converts a result of demodulation into a digital code to measure the distance to the target.

2. The distance measuring apparatus of claim 1, wherein the I template generation part comprises a signal delay unit configured to delay the pulse output from the DTC,
    wherein the signal delay unit comprises:
        a plurality of buffers connected in a cascade manner; and
        a controllable delay unit connected between outputs of the buffers and a reference voltage, and
    the signal delay unit is configured to delay the pulse output from the DTC so that a phase of the I template signal generated by the I template generation part and a phase of the Q template signal generated by the Q template generation part differ by a 90 degree angle.

3. The distance measuring apparatus of claim 2, wherein the controllable delay unit comprises:
    switches; and
    capacitors connected to the switches respectively in series,
    wherein connection and disconnection of the switches are controlled by a control signal.

4. The distance measuring apparatus of claim 3, wherein the capacitors of the controllable delay unit connected to the outputs of the buffers have the same capacitance.

5. The distance measuring apparatus of claim 3, wherein the capacitors of the controllable delay unit connected to the outputs of the buffers have different capacitances.

6. The distance measuring apparatus of claim 3, wherein capacitance of any one of the capacitors of the controllable delay unit connected to the outputs of the buffers is twice capacitance of another of the capacitors.

7. The distance measuring apparatus of claim 2, further comprising:
    an analog-to-digital converter (ADC) configured to convert the result of demodulation into the digital code; and
    a processor configured to calculate the distance to the target by using the digital code.

8. The distance measuring apparatus of claim 7, wherein the processor is configured to control the controllable delay unit by comparing an amplitude and a phase angle when the I template impulse signal and the Q template impulse signal have a phase difference of a 90 degree angle, with an amplitude and a phase angle of the I template impulse signal generated by the I template generation part and with an amplitude and a phase angle of the Q template impulse signal generated by the Q template generation part.

9. The distance measuring apparatus of claim 1, wherein the Q template generation part comprises a signal delay unit configured to delay the pulse output from the DTC,
    wherein the signal delay unit comprises:
        a plurality of buffers connected in a cascade manner; and
        a controllable delay unit connected between outputs of the buffers and a reference voltage, and
    the signal delay unit is configured to delay the pulse output from the DTC so that a phase of the Q template signal generated by the Q template generation part and a phase of the I template signal generated by the I template generation part differ by a 90 degree angle.

10. The distance measuring apparatus of claim 1, wherein the I correlator comprises: a mixer configured to mix the signal reflecting off the target and the I template impulse signal; and an integrator configured to accumulate an output of the mixer, and
    the Q correlator comprises: a mixer configured to mix the signal reflecting off the target and the Q template impulse signal; and an integrator configured to accumulate an output of the mixer.

11. A template signal generator, comprising:
an in-phase (I) template signal generation part configured to receive a pulse output from a digital-to-time converter (DTC) and generate an I template impulse signal;
a quadrature (Q) template signal generation part configured to receive the pulse output from the DTC and generate a Q template impulse signal; and
a delay unit configured to delay the pulse output from the DTC so that the I template impulse signal and the Q template impulse signal have a phase difference of a 90 degree angle.

12. The template signal generator of claim 11, wherein the I template signal generation part comprises a signal delay unit configured to delay the pulse output from the DTC,
wherein the signal delay unit comprises:
a plurality of buffers connected in a cascade manner; and
a controllable delay unit connected between outputs of the buffers and a reference voltage, and
the signal delay unit is configured to delay the pulse output from the DTC so that a phase of the I template signal generated by the I template generation part and a phase of the Q template signal generated by the Q template generation part differ by a 90 degree angle.

13. The template signal generator of claim 12, wherein the controllable delay unit comprises:
switches; and
capacitors connected to the switches respectively in series,
wherein connection and disconnection of the switches are controlled by a control signal.

14. The template signal generator of claim 13, wherein the capacitors of the controllable delay unit connected to the outputs of the buffers have the same capacitance.

15. The template signal generator of claim 13, wherein the capacitors of the controllable delay unit connected to the outputs of the buffers have different capacitances.

16. The template signal generator of claim 13, wherein capacitance of any one of the capacitors of the controllable delay unit connected to the outputs of the buffers is twice capacitance of another of the capacitors.

17. The template signal generator of claim 13, wherein the processor is configured to control connection and disconnection of the switches so that the I template impulse signal and the Q template impulse signal have the phase difference of the 90 degree angle.

18. The template signal generator of claim 11, wherein the Q template signal generation part comprises a signal delay unit configured to delay the pulse output from the DTC,
wherein the signal delay unit comprises:
a plurality of buffers connected in a cascade manner; and
a controllable delay unit connected between outputs of the buffers and a reference voltage, and
the signal delay unit is configured to delay the pulse output from the DTC so that a phase of the Q template signal generated by the Q template generation part and a phase of the I template signal generated by the I template generation part differ by a 90 degree angle.

19. A template signal mismatch calibration apparatus, comprising:
a digital-to-time converter (DTC) configured to receive a clock signal and output a pulse corresponding to a provided code;
an in-phase (I) template generation part configured to be triggered by the pulse output from the DTC to generate an I template impulse signal;
a quadrature (Q) template generation part configured to be triggered by the pulse output from the DTC to generate a Q template impulse signal; and
a processor configured to control a delay time of the pulse output from the DTC, by comparing an amplitude and a phase angle when the I template impulse signal and the Q template impulse signal have a phase difference of a 90 degree angle, with an amplitude and a phase angle of the I template impulse signal generated by the I template generation part and with an amplitude and a phase angle of the Q template impulse signal generated by the Q template generation part.

* * * * *